UNITED STATES PATENT OFFICE.

JUDSON A. DE CEW, OF MONTREAL, QUEBEC, CANADA.

METHOD OF MAKING EMULSIONS.

1,317,617. Specification of Letters Patent. Patented Sept. 30, 1919.

No Drawing. Application filed February 25, 1918. Serial No. 219,133.

*To all whom it may concern:*

Be it known that I, JUDSON A. DE CEW, a subject of the King of Great Britain, and resident of the city of Montreal, in the Province of Quebec and Dominion of Canada, have invented certain new and useful Improvements in Methods of Making Emulsions, of which the following is a full, clear, and exact description.

This invention relates to the process for making emulsions from oily, waxy or resinous materials, and involves the principle of emulsification by means of a partial saponification of oil within the apparatus in which the oil material is brought into contact with a dilute aqueous alkaline solution under pressure.

The effect of this action is to produce a fine dispersion of oily particles in the alkaline solution which attacks them with a soap forming action, which breaks the oil particles up into a still finer state of subdivision.

In this process therefore there are two atomizing actions, one mechanical and the other chemical. The mechanical action is obtained by forcing the oil under pressure through the atomizing device. The chemical action is the result of the affinity of the free alkali in the diluting solution for that portion of the oily particle which is saponifiable.

The chief use for this process is the production of emulsions suitable for lubrication of machine-cutting tools, and the like, but the principle may also be applied to the emulsifying of oils for other purposes.

In carrying out this process, I use an oily material, a portion of which will have a saponifying action in contact with alkali. If an unsaponifiable material, such as mineral oil or wax, is to be used, I would then incorporate into this material 10% or more of an easily saponifiable oil, as for example, lard oil, oleo oil or oleic acid, or similar product. The blended oil is then either drawn by suction, or forced by pressure through an atomizing or emulsifying apparatus in which it is broken up into a series of fine particles by coming in contact in a suitable manner with a warm aqueous solution.

In order to accelerate and increase the atomizing effect, this aqueous solution is charged with a sufficient amount of free alkali such as soda ash, caustic soda or silicate of soda, to saponify the soap-forming portion of the oily mixture. This action takes place as the oil compound and the alkaline solution are passing through the emulsifying device, after which the diluted mixture is further discharged into water at lower temperature where the mixture is cooled by further dilution.

The emulsifying apparatus to be used may be such as used in U. S. reissue patent to Erfurt #12,549 or my U. S. application serial #235,138 or any other suitable emulsifying apparatus. I prefer to use hot alkaline solution, which may be brought to the emulsifying apparatus under suitable pressure and the oil to be emulsified which contains a soap-forming oil, may be fed either by gravity or by pressure applied directly or indirectly. The oil and aqueous solutions are brought together in such a manner as to obtain the greatest amount of saponification of the soap-forming portion of the oil, and the apparatus is designed or adjusted to give the greatest atomizing effect, as this increases the emulsifying action of the alkaline solution.

Oils, resions or mixtures thereof, can be made into emulsions in this manner and the proportion of saponifiable oils necessary to accomplish the result is 10% of the weight of the oil used. If a larger proportion of saponifiable oil is used, the action takes place more easily and the final proportions to be used under special conditions, will be fixed by the relative efficiency and cost of the emulsions produced.

While it is true that unsaponifiable oils have been emulsified by blending them with a saponifiable oil or oleic acid, and stirring them directly into a cold alkaline solution, the result of this method is a coarse emulsion, the particles of which resist the action of the alkali, and as a result these particles coalesce and separate on standing, with the result that most of the lubricating efficiency of the emulsions is lost. If on the other hand, saponification is carried out by stirring the blended oil directly in hot water, fine emulsions may be made for an instant by the chemical action of the alkali, but as the ultimate emulsion is hot, the liberated particles of unsaponifiable oil having increased surface tension at these high temperatures, rapidly melt together, loosing their emulsified character and forming an oily layer on the surface of the solution.

In order, therefore, to obtain both fine and stable emulsions which have effective lubricating action, it is essential that an atomizing action takes place before or along with the emulsifying action of the alkaline solution, and that this emulsion which is produced at a temperature too high for stability, be further diluted with sufficient water at lower temperature to obtain a final stable emulsion. This temperature of stability may vary within certain limits depending upon the required use of the emulsion but they generally should be lower than 100 degrees Fahrenheit.

One means of carrying out this process is to warm the oils or compound in a small open tank while in another tank, an alkaline solution is prepared. This alkaline solution is brought into the atomizing apparatus in which it is blown by pressure against a fine stream of the material to be emulsified. The oily material is thus subdivided while dispersed into very fine particles to the saponifying and disintegrating action of the alkali, and in this manner it is emulsified or subdivided into the finest particles that can be produced by mechanical and chemical action.

This fine emulsion is then forced into a tank of cool water where the particles are given a greater degree of dispersion and where the temperature is such as to retard the coagulation of the oil particles.

Oils which already contain fatty acids or which are themselves easily saponified may also be emulsified by this process without further addition of oil material.

Having thus described my invention, I claim:

1. A method of preparing emulsions from oily materials, which would not heretofore make stable emulsions, by a combination of mechanical and chemical means which consist in sub-dividing the oil into fine particles by means of any pressure within an atomizing device and at the same time bringing it into intimate contact with a warm alkaline solution violently agitating the oil and immediately discharging the emulsions thus produced into an aqueous solution at a lower temperature whereby a stable emulsion is produced.

2. A method of preparing emulsions from unsaponifiable oils, which would not heretofore make stable emulsions, by a combination of mechanical and chemical means, which consists in incorporating into the material to be emulsified approximately 15% of a soap-forming oil, passing the mixture through an atomizing apparatus simultaneously with an aqueous alkaline solution whereby the solution and oil are violently agitated, and then immediately directing a jet of the resulting emulsion consisting of finely divided oil particles suspended in an alkaline soap solution into a colder aqueous solution where the emulsion is brought to a stabilizing temperature.

In witness whereof, I have hereunto set my hand.

JUDSON A. DE CEW.